United States Patent [19]
Matsufuru

[11] Patent Number: 4,986,862
[45] Date of Patent: Jan. 22, 1991

[54] SEALANT INJECTION METHOD AND AN APPARATUS THEREFOR

[75] Inventor: Takayoshi Matsufuru, Hiroshima, Japan

[73] Assignee: AOI Chemical Inc., Japan

[21] Appl. No.: 434,038

[22] Filed: Nov. 9, 1989

[30] Foreign Application Priority Data

Nov. 9, 1988 [JP] Japan ................................ 63-283092

[51] Int. Cl.[5] ................................................ B32B 35/00
[52] U.S. Cl. ........................................... 156/94; 141/1; 141/114; 156/578; 264/36; 425/12; 425/13
[58] Field of Search ....................... 141/1, 114; 156/94, 156/578; 264/36; 425/12, 13; 222/213, 215

[56] References Cited

U.S. PATENT DOCUMENTS 4,555,286 11/1985 Orikasa et al. ........................ 156/94
4,555,295 11/1985 Orikasa et al. .................... 156/94 X
4,622,085 11/1986 Yamada et al. ....................... 156/94
4,861,401 8/1989 Miura et al. .......................... 156/94

*Primary Examiner*—Robert A. Dawson
*Attorney, Agent, or Firm*—Oliff & Berridge

[57] ABSTRACT

The present invention is a method of sealant injection and the apparatus to be used therefor. The method is comprises the steps of injecting the sealant into a bellows-like injection container through a check valve and compressing the container resiliently by the spring means to inject the sealant into the cracks of the structures of such as concrete at a low velocity and under a low pressure constantly. The apparatus comprises an injection pipe to be adhered to the surface of the crack, a bellows-like injection container to be connected the pipe, a check valve provided between the injection container and the injection inlet and resilient means to compress the container.

8 Claims, 6 Drawing Sheets

SEALANT INJECTION METHOD AND AN APPARATUS THEREFOR

BACKGROUND OF THE INVENTION

1. Field of the Invention

The present invention relates to a method of injecting a sealant such as adhesives (sealant) in the cracks occurring in concrete structures, stones, tiles or mortars to repair those and an apparatus thereof.

2. Description of the Prior Art

Conventionally, such repairing method of concrete structures by injecting and filling a suitable sealant under pressure into the cracks occurring in the above structures has been carried out.

In order to fill the sealant such as adhesives in such kind of crack, however, there have been such drawbacks as it needs some special techniques and a long time, and further it results in a low processibility. In addition, because the filling process was carried out by the hand of an operator, it has often happened that the crack was widened due to the individual difference of filling pressure, that the finished mortar of the concrete surface was peeled, or the sealant was not filled sufficiently due to the lack of the suitable pressure.

The object of the present invention is to provide a method of filling a sealant with a high processibility employing a low pressure and a low velocity, without depending upon manpower, and an apparatus to be used for carrying out the method.

SUMMARY OF THE INVENTION

The method for injecting the sealant according to the present invention is characterized in the steps comprising fastening the base of an injection pipe by adhesive on the one part of a crack occurring in the structures such as concrete, sealing the other part of the crack uncovered by the base, connecting a bellows-like injection container capable of expansion and contraction to the injection pipe, and injecting the sealant into the crack by compressing the container with a resilient member such as spring, rubber and so on.

The apparatus to be used for carrying out the above method of the present invention is characterized in that the apparatus comprises an injection pipe having a base to be adhered to one part of the crack surface of the structure of the concrete, a bellows-like injection container capable of expansion and contraction and to be connected to the injection pipe, resilient means making the injection container clamp resiliently in order to compress the injection container, and a check valve which prevents a reverse flow of a sealant such as adhesive toward a sealant injection inlet.

In more detail, the injection container comprises a bellows-like main body capable of expansion and contraction, which is clamped by two plates, one end of which is provided with, at the center thereof, a connecting portion to the injection pipe, which is adapted to form a cylinder to connect to the injection pipe by being screwed, the other end of which is provided with a valve casing having a check valve accommodated therein, and the casing has also a sealant injection inlet.

In order to compress the bellows-like container, in one feature of the present invention, two plates clamping the container from both sides thereof are guided along a plurality of parallel bolt rods and the resilient means move elastically the plate which is disposed on the opposite end of the container to the end of which is connected to the injection pipe, so that as the two plates compress the container resiliently, the adhesive in the container is injected in the crack through the injection pipe.

In another feature of the present invention, the above plate which compresses the container toward the injection pipe may be replaced by the valve casing or a flange which is screwed on the outer circumference of the valve casing.

Alternatively, in order to compress the injection container, there may be resilient means which comprises two sheet of spring plates, both ends of which are joined. The injection container is clamped between the two spring plates and when the container is filled with a sealant, the container expands to receive a compression force from the spring plates.

In another type of resilient means, one of the above spring plates may be a string of such as wire, in which the injection container may be clamped between a spring plate and a string.

In a further feature of the present invention, the above check valve casing has a projection which is inserted in the connection portion of the container at the time of compression in order to expel the sealant in the connecting portion into the cracks.

The injection pipe is preferably transparent to observe the injection state from the outside of the pipe.

Also, the size of the base of the injection pipe should be as large as it can withstand the injection pressure.

As to the materials of the sealant, they can be two-components-type of adhesive comprising one main ingredient and any hardner.

DETAILED DESCRIPTION OF THE PREFERRED EMBODIMENT

Figure 1:
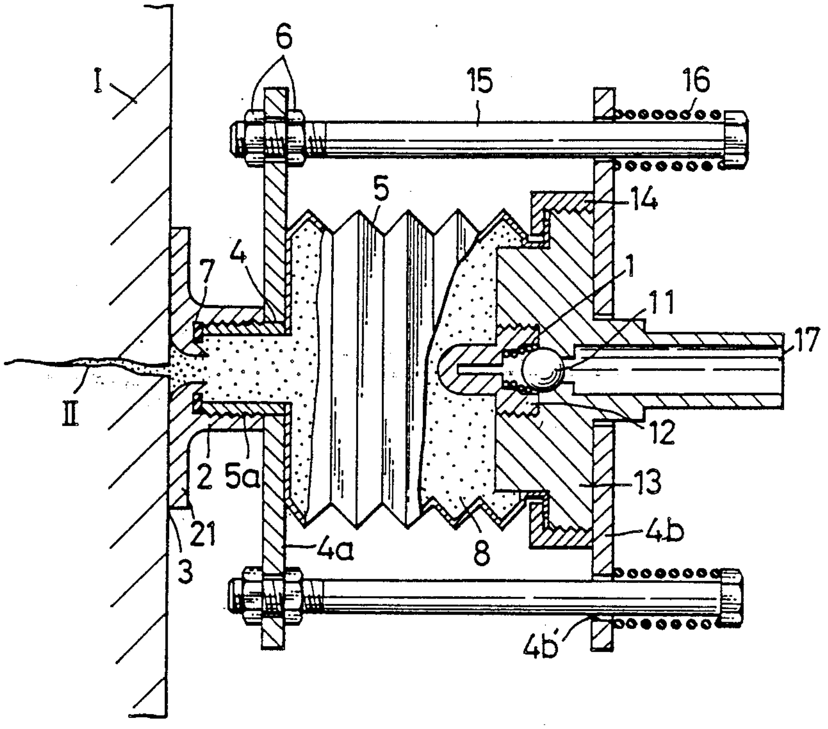
FIG. 1 shows a sectional view of the first embodiment of the present invention.

FIG. 1 illustrates how to fill the adhesive in the crack II occurring in the concrete surface I.

First, the injection pipe 2 having a base 21 is fixed by adhesive 3 on the concrete surface I where cracks occurred.

The surface of the cracks which is not covered by the base 21 is sealed by adhesive or sealing agent.

After the adhesive or the seal agent coated on the crack surface is hardened, a vacant (or contracted) injection container 5 is connected to the injection pipe 2 by being screwed. The use of a rubber packing 7 between the injection pipe 2 and the joint portion 5*a* of the container 5 prevents leaking of the adhesive.

The vacant injection container 5 is prepared in advance to form a compressed state by a compressing member. At the other end of the injection container, a valve casing 13 is fixed thereto by clamping the end of the container between the valve casing 13 and the flange of the bellows holder 14, and to the valve casing 13 a check valve ball retainer 12 is fixed by being screwed, and further between the valve casing 13 and the retainer 12 a check valve ball 11 and a compression spring 1 are clamped in such a manner that the ball 11 is forced resiliently toward the injection inlet 17. The other end of the bellows-like container 5 is screwed in the female screw which is threaded on the inner circumference of the bellows holder 14.

Thus, the bellows portion of the container 5 is disposed between the plate 4*a* and the plate 4*b*. And these plates 4*a* and 4*b* are provided with at least three bolt rods 15, one end of each bolt rod 15 is fastened to the plate 4*a* by nuts 6 and the other end of the bolt rod 15 goes through the through hole 4*b*'. Between the tip end of the bolt rod 15 and the plate 4*b*, a compression spring 16 is arranged to force the plate 4*b* toward the plate 4*a*.

This compression spring 16 is replaceable by any kind of spring means such as a tension, a compression spring or some other resilient means as long as it functions as well as the compression spring 16. In addition, the joint portion 5*a* may be or not be fastened to the hole 4 of the plate 4*a*.

Figure 2:
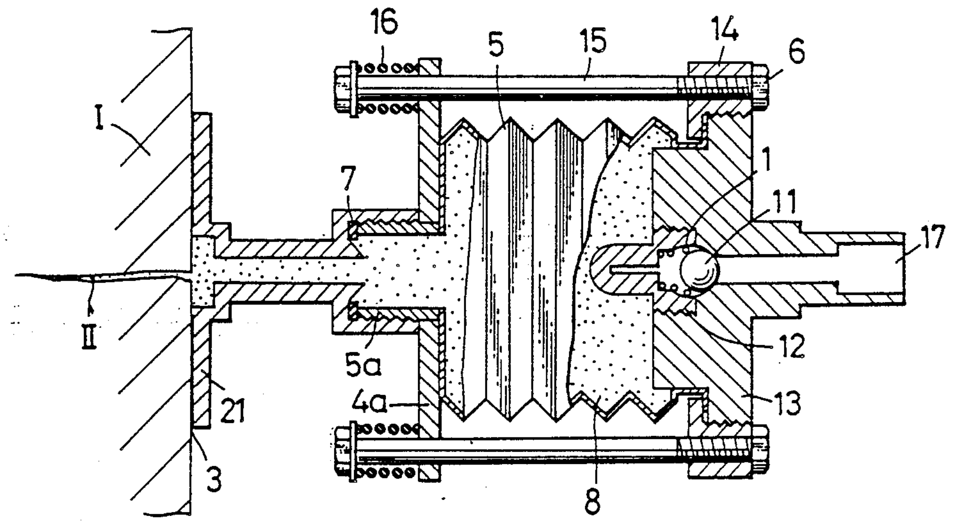
FIG. 2 shows a sectional view of the second embodiment of the present invention.

FIG. 2 illustrates the second embodiment of the apparatus of the present invention which is used for carrying out the method of the present invention.

In this embodiment, the same elements of the apparatus to the one of FIG. 1 are indicated by the same reference numerals. In FIG. 2, in place of the plate 4*b* of FIG. 1 the bellows holder 14 is used for holding the bolt rod, so that the bellows-like container 5 is clamped between the plate 4*a* and the valve casing 13 which is screwed in the bellows holder 14. The one end of the bolt rod 15 is fastened to the bellows holder 14 by an appropriate means. The other end of the bolt rod 15 comes through the hole of the plate 4*a* and the compression spring 16 is disposed between the tip end of the bolt rod and the plate 4*a*, so that the container 5 is forced to be compressed resiliently between them due to the spring 16 to inject the adhesive (sealant) of the container into the crack.

In this embodiment, as the bolt rod protrudes toward the concrete surface, the length of the injection pipe 2 is increased to avoid the bolt rod from hitting the surface.

Figure 3:
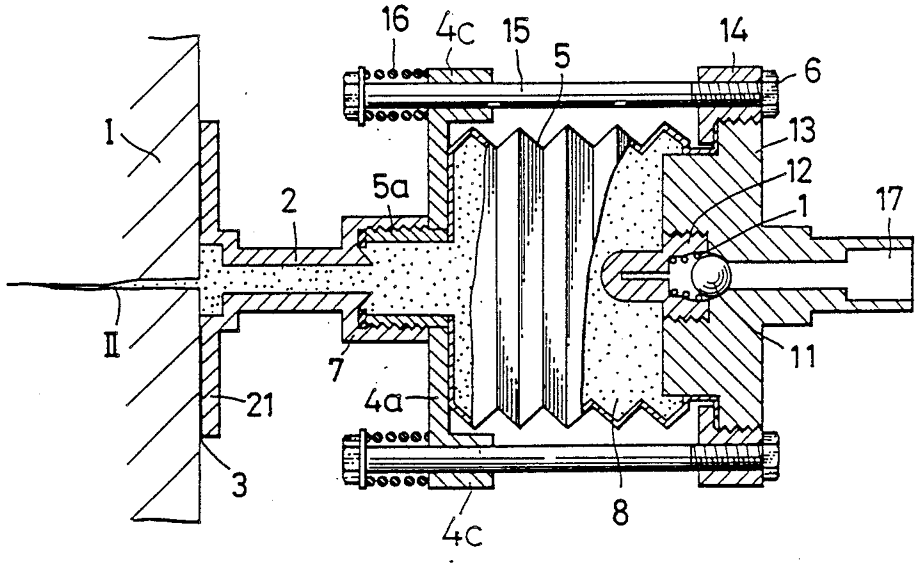
FIG. 3 shows a sectional view of the third embodiment of the present invention.

FIG. 3 illustrates the third embodiment of the apparatus of the present invention. The structural difference from FIG. 2 is the configuration of the plate 4*a*, in which the through holes of the bolt rod are provided at a thicker portion 4*c* of the plate 4*a*, so that the bolt rod is prevented from swinging when it comes through the hole, so that it becomes easy to be supplied with the adhesive from the injection inlet 17.

In the apparatusses illustrated in FIGS. 2 and 3, one of the plates can be eliminated.

Figure 4:
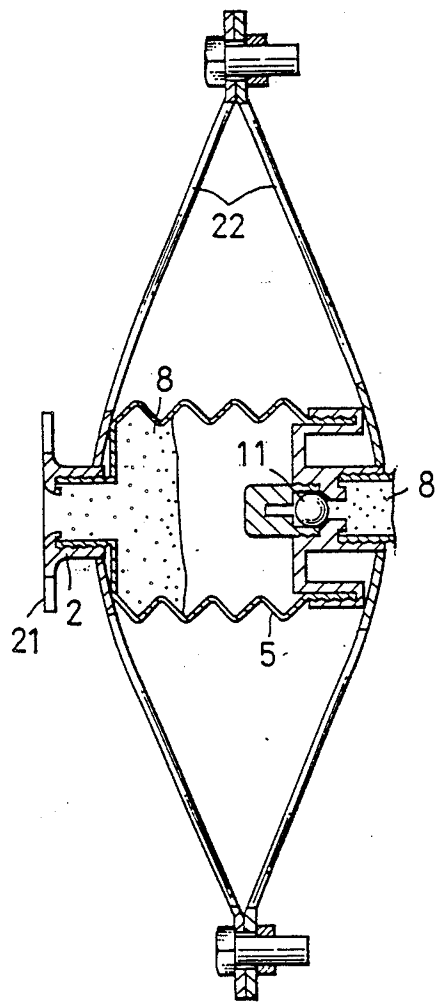
FIG. 4 shows a sectional view of the 4th embodiment of the present invention.
Figure 5:
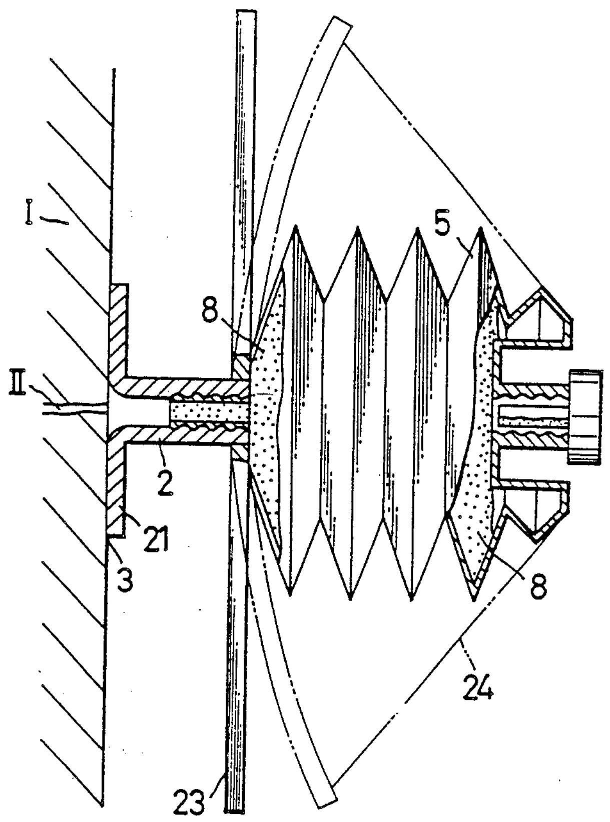
FIG. 5 shows a sectional view of the 5th embodiment of the present invention.

In FIGS. 4 and 5, which show the 4th and 5th embodiments of the present invention, the other type of resilient means for compressing the injection container 5 are illustrated.

In FIG. 4 two sheets of spring plate 22 joined at both ends thereof clamp the another type of bellows-like injection container 5 to compress it, when the container expands, to cause an injection of the adhesive 8 into the crack.

In FIG. 5, another type of the resilient means is illustrated for compressing the injection container 5, in which the resilient means comprises a sheet of spring plate 23 and a string 24 which is tensioned between both ends of the spring plate 23. These spring plate 23 and the string 24 function as a bow and between those the container 5 is compressed as illustrated in figure by a phantom line.

Figure 6:
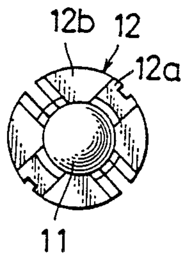
FIG. 6 is a front view of another check valve of the present invention.
Figure 7:
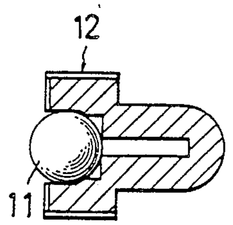
FIG. 7 is a sectional view of the check valve of FIG. 6.
Figure 8:
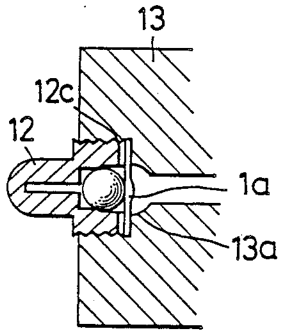
FIG. 8 is a sectional view of the check valve mounted in the valve casing.

In FIGS. 6–8 show a variation of the check valve illustrated in FIGS. 1–4. FIG. 6 shows the ball retainer 12 by viewing from the ball of the check valve, and FIG. 7 shows a sectional view of FIG. 6. The surface 12*a* of the ball retainer 12 is lower than the level of the surface 12*b*. FIG. 8 is a sectional view of the check valve which is formed by the combination of the ball retainer 12 and the valve casing 13 in which the former is mounted in the latter. In FIG. 8, 1*a* shows a disc-like elastic sheet made of rubber sheet, soft plastic sheet or such like.

As illustrated in FIG. 8, the elastic sheet 1*a* is clamped between the surface 12*b* of the ball retainer 12 and the valve casing 13. When injecting the adhesive in the container 5, the adhesive is injected in the container 5, the adhesive is injected in the container 5 by passing through the gap 12*c* existing between the elastic sheet 1*a* and the surface 12*a* of the ball retainer 12. When the container 5 is compressed by the spring 16 the reverse flow of the adhesive is prevented by the ball 11 which presses the elastic sheet 1*a* against the surface 13*a* of the valve casing 13.

In operation, the injection method of the sealant in the cracks II of the structures of such as the concrete is carried out by the steps of adhering the base of the injection pipe 2 to one part of the crack II, sealing the uncovered part of the crack surface with the sealant and drying it, connecting the bellows-shaped container 5 to the injection pipe 2, which is resiliently clamped by two plates, and injecting the adhesive 8 into the container 5 through the check valve 11, subsequently the adhesive 8 is injected into the crack II through the injection pipe 2 by being forced by the spring 16 at a low velocity and under a low pressure. The adhesive injected into the container 5 is prevented from flowing reversely toward the inlet 17 due to the check valve ball 11.

According to the present invention, since the sealant is injected into the cracks automatically by the resilient compression of the spring or rubber and so on which compresses the bellows-like container, there is no need of the pressing the container by an operator, in addition the variation of the injected state of the sealant due to the individuality of operator can be avoided.

Further, according to the present invention, by replacing or selecting the kinds of the materials of the container, the spring or the rubber and/or the shapes thereof, the compression velocity and the force of the injection container can be arranged, so that the injecting velocity of the sealant can be varied easily.

What is claimed is:

1. Sealant injection method for injecting adhesive into cracks of a structure comprising the steps of:
   - fastening the base of an injection pipe by adhesive on one part of a crack occurring in a structure,
   - sealing the other part of the crack uncovered by the base,
   - connecting a bellows-like injection container capable of expansion and contraction to the injection pipe, and injecting the sealant through a check valve into the crack by compressing the container with a resilient member.

2. Sealant injecting method set forth in claim 1, the sealant is a two-components-type of adhesive comprising one main ingredient and hardner.

3. Sealant injecting method as set forth in claim 1, the vacant injection container is connected to the injection pipe, subsequently the sealant is injected into the container through a check valve which is provided on the opposite end of the container to the injection pipe.

4. A sealant injection apparatus for injecting adhesive into cracks of a structure characterized in that the apparatus comprises;

an injection pipe having a base to be adhered to one part of the crack surface of a structure, a bellows-like injection container capable of expansion and contraction which is connected to the injection pipe, a check valve between the bellows-like container and an injection inlet connected to the check valve, and resilient means to compress resiliently the injection container.

5. A sealant injection apparatus as set forth in claim 4, wherein the resilient means is a compression spring provided so as to compress the bellows-like injection container.

6. A sealant injection apparatus as set forth in claim 4, wherein the resilient means is a clamping means comprising two sheets of spring plates both ends of which are joined and between which the bellows-like injection container is clamped.

7. A sealant injection apparatus as set forth in claim 6, wherein one of the spring plates is a string.

8. A sealant injection apparatus as set forth in claim 4, wherein the tip of the check valve retainer is capable of being accommodated in the injection pipe.

* * * * *